United States Patent Office 2,976,682
Patented Mar. 28, 1961

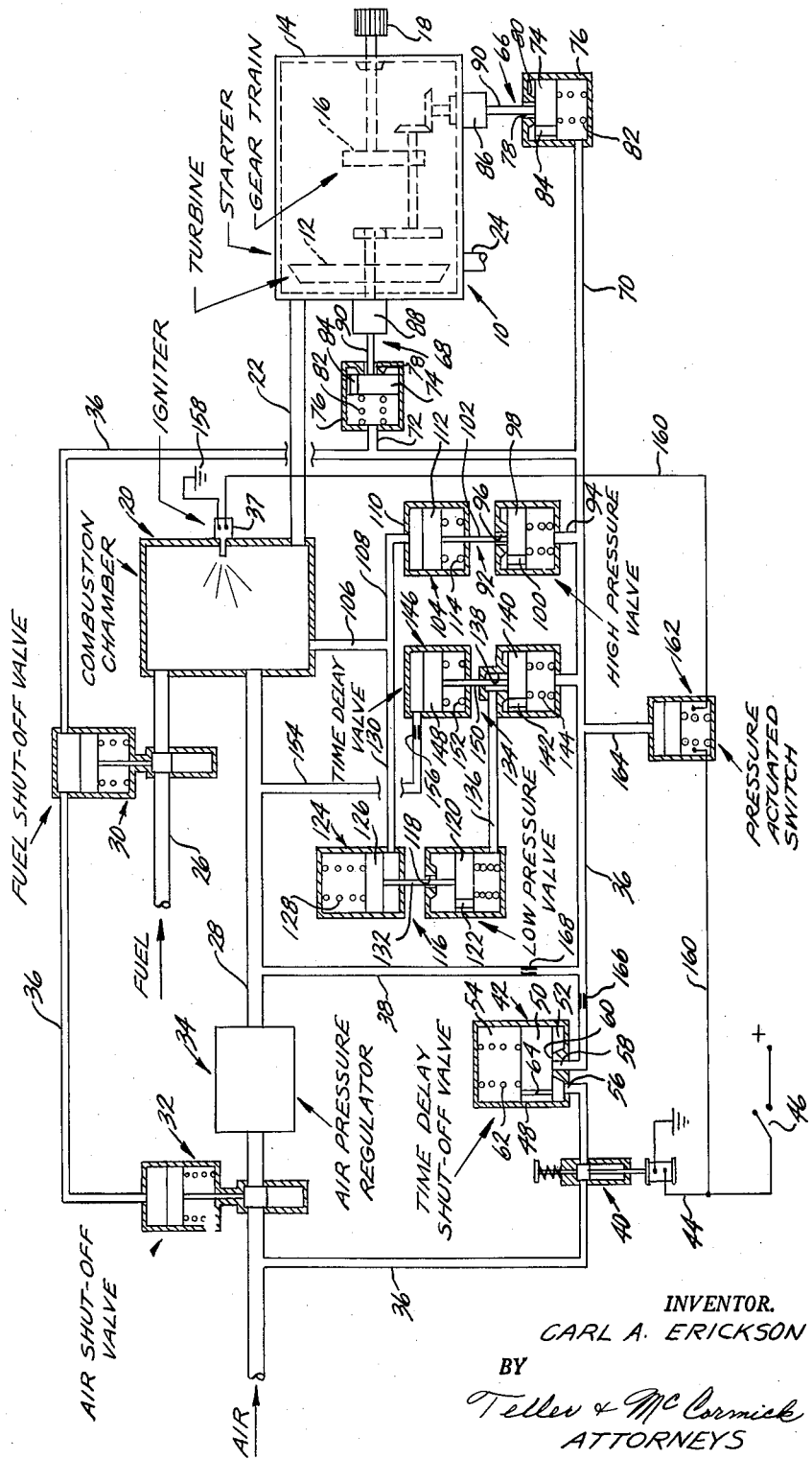

2,976,682
PNEUMATIC CONTROL SYSTEM FOR FUEL-AIR STARTER

Carl A. Erickson, Oil City, Pa., assignor to United Aircraft Corporation, East Hartford, Conn., a corporation of Delaware Filed Apr. 9, 1958, Ser. No. 727,487

10 Claims. (Cl. 60—39.14)

This invention relates to a gas propelled starter for an aircraft engine or the like and, more specifically, to a pneumatic control system therefor.

It is the general object of the invention to provide a pneumatic control system for a starter of the aforementioned type which control system is adapted upon being activated to initiate flow of fuel and air to a gas generator or combustion chamber and to ignite the fuel and air therein whereby to generate gases for starter operation, the system to include means for shutting off the flow of fuel and air and terminating ignition when the starting cycle is completed, and the said system also to include means for shutting off the flow of fuel and air and terminating ignition in the event that combustion pressure is too high or too low.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single view of the drawing is a schematic illustration of the starter assembly and the pneumatic control system therefor.

The starter per se is indicated generally by the reference numeral 10 and is shown to be remote from the other components of the starter system, but it should be understood that all of the components and elements of the system can be united in a single assembly. The starter 10 is of the type which is gas-propelled and includes a turbine 12 disposed in a turbine chamber defined in a housing 14, the said housing also accommodating a gear train 16 which interconnects the turbine 12 with a starter output shaft 18. The gases for propelling the turbine 12 are generated within a gas generator or combustion chamber 20 and are introduced to a suitable turbine nozzle structure through a conduit 22. The gases are discharged from the turbine chamber and from the housing 14 through an exhaust port 24.

There are a wide variety of fluid fuels which can be mixed with air to provide a combustible mixture for the combustion chamber 20, and no specific fuel is designated. While the fuel and air can be mixed before introduction into the combustion chamber, in the preferred starter system the fuel is introduced from a pressurized source through a supply conduit 26 and the air is introduced from a pressurized source through a supply conduit 28. A normally closed shut-off valve 30 including pneumatically operated valve opening means is disposed in the fuel supply conduit 26 and a normally closed shut-off valve 32 which also includes pneumatically operated valve opening means is disposed in the air supply conduit 28. There is also incorporated in the air supply conduit 28 between the shut-off valve 32 and the combustion chamber 20 an air pressure regulator 34.

While the drawing and description relate specifically to a system wherein there are two supply conduits for the gas generator, one for fuel and one for air, it will be understood that but one conduit and thus but one valve will be needed if the fuel and air are pre-mixed before introduction to the assembly or if a fuel which burns without air is used. In either event, control of the system can be exercised by the elements to be described without material variation as to structure or function.

All of the aforesaid elements of the starter assembly are either directly or indirectly operated and controlled by a pneumatic control system which is provided in accordance with the present invention. That is, a valve control conduit 36 which forms a part of said control system is connected to the pneumatically operated opening means of the fuel and air shut-off valves 30 and 32 and pressurized air is selectively supplied therethrough for opening said valves whereby to initiate flow of fuel and air to the combustion chamber 20. The combustion chamber 20 is fired by an igniter 37 which is energized and de-energized responsive to air pressure in the control conduit 36 as will be described more fully hereinafter. In addition to the foregoing, there is provided in the pneumatic control system for fulfilling the aforesaid general object of the invention, and specifically for shutting off the flow of fuel and air when the starting cycle is completed or when combustion pressure is too high or too low, selectively operable means for venting the valve control conduit 36 whereby to reduce the pressure of the air therein and thereby to close the fuel and air shut-off valves 30 and 32. The said venting means includes normally closed speed responsive means operated by the starter for venting the control conduit 36 at a predetermined starter speed and normally closed pressure responsive means operable for venting the control conduit 36 when the pressure in the gas generator 20 is in excess of normal combustion pressure, and said venting means also includes normally closed pressure responsive means operable for venting said valve control conduit when pressure in the gas generator 20 is below normal combustion pressure after combustion has been established or should have been established.

The fuel and air shut-off valves 30 and 32 are shown only schematically and, for the purposes of the present invention, any well-known type of valve which includes pneumatically operated means adapted to open the valve when pressurized air is supplied thereto and adapted to close the valve upon interruption in the supply of pressurized air may be utilized.

The valve control conduit 36 which is connected to the operating means for the fuel and air shut-off valves 30 and 32 for supplying pressurized air thereto may be connected to any suitable source of pressurized air. Preferably, however, the conduit 36 is connected for a supply of pressurized air to the gas generator air supply conduit 28 upstream of the air shut-off valve 32 disposed therein. When the valve control conduit 36 is so connected, there is provided a connecting conduit 38 between said control conduit and the gas generator supply conduit 28 downstream of the air shut-off valve 32. Preferably, the connection of the conduit 38 with the air supply conduit 28 is downstream also of the air pressure regulator 34 disposed in said supply conduit.

In accordance with the present invention, there is disposed in the valve control conduit 36 valve means operable selectively to permit a flow of pressurized air therethrough for actuating the pneumatically operated means and opening the fuel and air shut-off valves 30 and 32. When the valve control conduit 36 is connected to the air supply conduit 28 for a supply of pressurized air, the said valve means is disposed in the control conduit upstream of the connecting conduit 38 and is adapted first to be opened whereby to allow pressurized air to flow through said control conduit for opening the fuel and air valves 30 and 32 and is adapted to be closed thereafter whereupon said fuel and air valves are held open by pressurized air supplied to said control conduit and their pneumatically operated opening means through said connecting conduit. In preferred form, the valve means disposed in the control conduit 36 comprises an electrically operable valve 40 and a pneumatically operable time delay shut-off valve 42.

The electrically operable valve 40 is preferably of the type which is normally closed and is adapted to be opened selectively, as by a solenoid, responsive to demand by the aircraft pilot. Thus, a locally grounded solenoid provided for opening the valve 40 is connected to a source of electrical power by a line 44 and a switch 46. The switch 46, located in the pilot's compartment, is preferably of the two-position type which is movable manually from one position to the other. Thus, when the aircraft pilot positions the switch 46 to complete the electrical circuit for the valve 40, the said valve will be opened to allow pressurized air to flow through the control conduit 36 to the time delay shut-off valve 42. The valve 40 will then remain open until the switch 46 is positioned by the aircraft pilot to disconnect said valve from the electrical power source.

The time delay shut-off valve 42 comprises, in preferred form, a housing 48 and a piston 50 reciprocable therein, the said piston cooperating with the housing to define first and second chambers 52 and 54 disposed on opposite sides thereof. Formed in the housing 48 and communicating with the first chamber 52 are inlet and outlet ports 56 and 58. The inlet port 56 is adapted to receive an end of a first portion of the control conduit 36 extending from the valve 40 thereto and the outlet port is adapted to receive an end of a second portion of the conduit 36 which extends therefrom past the connecting conduit 38 to the fuel and air shutoff valves 30 and 32. Also provided in the housing 48 of the time delay shut-off valve is an inwardly extending annular flange 60 located adjacent the outlet port 58. The piston 50 is urged into engagement with the end of said flange by a spring 62 provided in the chamber 54 whereby to close the outlet port 58. Extending through the piston 50 there is a small passage 64 which provides communication between the chambers 52 and 54.

When the electrically operable valve 40 is opened by the aircraft pilot allowing pressurized air to enter the first chamber 52 of the shut-off valve 42, the piston 50 is initially moved thereby against the spring 62 to open the outlet port 58. Thereupon, pressurized air flows through the said outlet port and the second portion of the valve control conduit 36 to open the fuel and air shut-off valves 30 and 32. Concurrently, air in the chamber 52 bleeds through the piston passage 64 and pressure builds up in the chamber 54, eventually to equal the pressure in the chamber 52. At some preselected pressure in the chamber 54 equal to or less than the chamber 52 pressure, the piston 50 is moved by the spring 62 to close the outlet port 58. During the time that the shut-off valve 52 is open, however, pressurized air is supplied through the generator supply conduit 28 to the connecting conduit 38. Thus, when shut-off operation of the valve 42 occurs, the supply of pressurized air to the fuel and air shut-off valves 30 and 32 is not interrupted, air then being supplied to the control conduit 36 through the said connecting conduit.

From the foregoing, it will be seen that the shut-off valve 42 is operable automatically to open when the valve 40 is opened and is further operable automatically to close a predetermined period of time thereafter. The period of time delay is a function of the volume of the chamber 54, the area of the passage 64 and the pressure of the air supplied to the chamber 52, and it will be seen that said period may be predetermined so as to insure opening of the fuel and air shut-off valves 30 and 32 and supply of pressurized air through the conduit 28 to the connecting conduit 38 before closing of the valve 42.

The aforementioned speed responsive venting means operated by the starter 10 comprises, in preferred form, a pair of similar valves 66 and 68. The said valves are normally closed and are adapted to be opened by centrifugal force or the like when the speed of rotation of the starter output shaft 18 reaches a predetermined level. A pair of branch conduits 70 and 72 respectively connect the valves 66 and 68 to the valve control conduit 36. Each of the valves 66 and 68 includes a piston 74 disposed in a housing 76 and the branch conduits 70 and 72 are connected to the valve housings 76, 76 so as to introduce pressurized air from the valve control conduit respectively to said housings on one side of the pistons 74, 74. On the opposite side of each piston 74, each housing 76 is provided with a vent port 78 communicating with the atmosphere or some other low pressure environment. Adjacent the vent port 78 of each valve housing 76, there is provided an annular flange 80 which extends inwardly in said housing. Each piston 74 is urged into engagement with the annular flange 80 so as to close the vent port 78 by a spring 82 disposed in the valve housing 76. Provided in each piston 74 is a passage 84 which extends through said piston and which is suitably sized so as to permit the free flow of air therethrough.

A valve actuator 86 is provided for the valve 66 and a valve actuator 88 is provided for the valve 68. The actuators 86 and 88 are shown only diagrammatically and may be of any well-known type wherein there is incorporated means for moving a plunger or the like responsive to rotational speed. For example, a spring biased flyweight device adapted to move a plunger from one position to another when the flyweight rotational speed reaches a predetermined level may be utilized. Thus, a plunger 90 extends from each of the actuators 86 and 88 into the vent port 78 and engages the piston 74 of each of the valves 66 and 68, the said plungers having suitably small cross sections so as not to inhibit the flow of air through the vent ports 78, 78. When the plungers 90, 90 are moved so as to urge the pistons 74, 74 away from the vent ports 78, 78, air from the conduits 70 and 72 passes through the piston passages 84, 84 and is vented to atmosphere through the said ports. As a result, the pressure of the air in the control conduit 36 is reduced whereby to close the fuel and air shut-off valves 30 and 32.

The actuator 86 for the valve 66 is connected to the starter gear train 16 and is driven thereby and the actuator 88 for the valve 68 is similarly connected to the turbine 12 of the starter 10 and said actuators are preset to move their respective plungers at different rotational speeds corresponding to different starter output shaft speeds. Thus, shut-off of the flow of fuel and air to the combustion chamber 20 and termination of the starting cycle is insured in the event of failure of one of the valves 66 and 68 or failure of a starter component.

The pressure responsive means operable for venting the control conduit 36 when the pressure in the gas generator 20 is in excess of normal combustion pressure comprises, in preferred form, a normally closed high pressure valve 92 which may be similar in construction to the valves 66 and 68 but which is pressure rather than speed responsive. The high pressure valve 92 is connected to the control conduit 36 by a branch conduit 94 and said valve includes a vent port 96 which is adapted to be opened and closed by a piston 98 having a passage 100 extending therethrough. A plunger 102 for moving the piston 98 so as to open the vent port 96 is provided and is in turn positioned by a pressure responsive actuator 104. The actuator 104 is connected to the combustion chamber 20 by a branch conduit 108 which communicates with a main conduit 106 extending from said chamber. Disposed within a housing 110 of the actuator 104 is a piston 112 which is acted upon on one side thereof by combustion chamber gases from the conduit 108. The piston 112 has connected thereto on the opposite side thereof the plunger 102 and acting on said opposite side of the piston 112 is a spring 114.

When the pressure within the gas generator 20 exceeds normal combustion pressure, the piston 112 and plunger 102 are moved against the urging of the spring 114 to move the piston 98 so as to open the vent port 96 of the high pressure valve 92. Air from the control conduit 36 is thereupon bled through the branch conduit 94, the piston passage 100 and the vent port 96 whereby to reduce the pressure in said control conduit and to close the fuel and air shut-off valves 30 and 32.

The normally closed pressure responsive means operable for venting the valve conduit 36 when pressure in the gas generator 20 is below normal combustion pressure comprises, in preferred form, a low pressure valve 116 which is similar in construction to the high pressure valve 92. A vent port 118 is provided in the valve 116 and is adapted to be opened and closed by a piston 120 having a passage 122 extending therethrough. An actuator 124 for moving the piston 120 so as to open the vent port 118 of the valve 116 is provided and is similar to the actuator 104 for the valve 92 but is operable to open the said port when combustion pressure is too low rather than when said pressure is too high. A piston 126 in the actuator 124 is acted upon on opposite sides by a spring 128 and by gases from the combustion chamber 20. The gases from the chamber 20 are introduced to the actuator through a branch conduit 130 communicating with the main conduit 106 which is connected to the said chamber. The piston 126 has connected thereto on the side opposite the spring 128 a plunger 132 which engages the piston 120 of the low pressure valve 116. When the pressure of the gases from the gas generator 20 acting on the piston 126 are below normal combustion pressure, the said piston and the plunger 132 are moved by the spring 128 so as to move the piston 120 to open the vent port 118 of the low pressure valve 116.

When the fuel and air shut-off valves 30 and 32 are initially opened and before ignition of the fuel and air takes place in the gas generator 20, the pressure acting on the actuator piston 126 of the low pressure valve 116 will, of course, be below normal combustion pressure and the vent port 118 of said valve will be open as shown. Thus, if the low pressure valve is connected to the control conduit 36, the said conduit will immediately be vented, the fuel and air shut-off valves 30 and 32 will be closed and the starting cycle will be prematurely terminated. To prevent operation of the low pressure valve 116 in such manner, there is provided in the control system time delay means operable to render the said low pressure valve inoperable for a predetermined period of time subsequent to opening of the fuel and air valves 30 and 32.

The time delay means for rendering the low pressure valve 116 inoperable comprises, in preferred form, a time delay valve 134 disposed in a branch conduit 136 which connects the said low pressure valve to the valve control conduit 36. For a predetermined period of time after opening of the fuel and air shut-off valves 30 and 32, the time delay valve 134 remains closed so as to prevent venting of the control conduit 36 by the low pressure valve 116. Thereafter, sufficient time having been allowed for combustion to commence in the gas generator 20, the time delay valve 134 opens to connect the low pressure valve 116 to the control conduit 36 through the branch conduit 136.

Included in the time delay valve 134 is a port 138 which is adapted to be opened and closed by a piston 140 having a passage 142 extending therethrough. A first portion of the branch conduit 136 extending from the conduit 36 directs air to the side of the piston 140 opposite the port 138 and a second portion of the said branch conduit is connected to the port 138 and extends therefrom to the low pressure valve 116. Thus, when the piston 140 is moved to open the port 138 against a spring 144 which acts thereon, air from the control conduit 36 flows through the orifice 142 in said piston and through the port 138 to the low pressure valve 116.

A valve actuator 146 for moving the piston 140 so as to open the port 138 is provided and includes a piston 148 having connected thereto a plunger 150 which engages the piston 140. A spring 152 acts on one side of the piston 148 so as to urge said piston and the plunger 150 away from the piston 140. Acting on the opposite side of the piston 148 for moving said piston and the plunger 150 toward the piston 140 and opening the port 138 is pressurized air from the generator supply conduit 28 which is supplied through a conduit 154. A restriction 156 provided in the conduit 154 impedes the flow of air therethrough so that a predetermined period of time must elapse after air is supplied to the conduit 28 and to the conduit 154 before movement of the piston 148 for opening the port 138 will commence.

From the foregoing, it will be seen that when the fuel and air shut-off valves 30 and 32 are opened, the time delay valve 134 will initially be closed so as to prevent operation of the valve 116. Eventually as the pressure builds up in the generator supply conduit 28 and air flows through the conduit 154 and past the restriction 156, the piston 148 and the plunger 152 will move to position the piston 140 so as to open the port 138. The low pressure valve 116 will thus be connected to the control conduit 36 and, thereafter, if combustion pressures lower than normal occur, the said low pressure valve will open to vent the said control conduit whereby to close the fuel and air shut-off valves 30 and 32 and terminate the starting cycle.

As mentioned above, the igniter 37 associated with the combustion chamber 20 is energized and de-energized responsive to air pressure in the valve control conduit 36. Preferably, the igniter 37 is electrically operable and is provided with a local ground connection 158. A conductor 160 extending from the igniter 37 is connected to the conductor 44 for connection to the electrical power source through the pilot operated switch 46. Interposed in the conductor 160 is a fluid pressure actuated switch 162, which may be of any well-known type adapted to be closed when supplied with air under pressure and to be opened upon interruption in the supply of pressurized air thereto. A branch conduit 164 connected to the valve control conduit 36 extends to the pressure actuated switch 162 whereby to provide for opening and closing operation of the said switch responsive to pressure in said control conduit. It is believed that there is no invention involved in the specific structure of the switch 162, such devices being commercially available and, therefore, the said switch is shown only diagrammatically and description thereof is not herein included. When the switch 46 is closed by the aircraft pilot to initiate the starting cycle and after pressure has built up in the control conduit 36 so as to close the pressure switch 162, the igniter 37 will be energized. Thereafter, when the pressure in the control conduit 36 is vented by the speed responsive means or the combustion pressure responsive means described above, the pressure switch 162 will be opened whereby to de-energize the igniter 37.

In addition to the above described elements of the control system of the invention, there is preferably provided a restriction 166 in the valve control conduit 36 between the time delay shut-off valve 42 and the connecting conduit 38 and a restriction 168 in the said connecting conduit. The restriction 166 in the conduit 36 serves to reduce the pressure of the air initially supplied to the fuel and air shut-off valves 30 and 32 upon opening of the valves 40 and 42 and thereby makes possible the use of valves of relatively light construction. The restriction 168 has two functions; it serves initially, when the shutoff valve 42 is open, to prevent a disproportionate flow of air from the control conduit 36 to the combustion chamber 20 through the connecting conduit 38 and the supply conduit 28. Such diversion of the air from the portion of the control conduit 36 extending from the connecting conduit 38 to the fuel and air shut-off valves 30 and 32 might otherwise cause sluggish opening operation of the said valves. The second function of the restriction 168 is to facilitate a sharp reduction in the pressure of the air supplied to the fuel and air shut-off valves 30 and 32 and positive closing thereof upon opening of the speed and pressure responsive venting means described above. The restriction 168 serves this purpose after closing of the time delay shut-off valve 42 and during the time that the supply of pressurized air is provided for the valve control conduit 36 by the connecting conduit 38.

The significance of the mode of operation of the control system wherein the fuel and air shut-off valves 30 and 32 are initially opened by air supplied to the control conduit 36 from the generator supply conduit 28 upstream of the air shut-off valve 32 and wherein said fuel and air valves are thereafter held open by air supplied to the control conduit from the said generator supply conduit downstream of said air shut-off valve should be noted. By switching the supply sources for the control conduit 36 in shuch manner, the above described speed and pressure responsive venting means are prevented from exhausting the source of pressurized air and thus obviating the possibility of initiating a second starting cycle after an aborted starting cycle. That is, if the control system were constructed so that pressurized air were supplied thereto throughout the starting cycle from the generator supply conduit 28 upstream of the air shut-off valve 32, the time delay shut-off valve 42 being omitted from the system, the pressurized source supplying the conduit 28 could be exhausted upon operation of one of the gas generator pressure responsive venting means. Thereafter, if the pilot attempted to initiate a new starting cycle, starting, of course, could not be accomplished due to the absence of the necessary source of pressurized air. On the other hand, when the fuel and air shut-off valves 30 and 32 are initially opened by pressurized air supplied from the generator supply conduit upstream of the air shut-off valve 32 and are thereafter held open by pressurized air supplied from said supply conduit downstream of said shut-off valve, operation of one of the pressure responsive venting means will not result in the source of pressurized air being exhausted. Once the air shut-off valve 32 is closed as a result of the control conduit 36 being vented to atmosphere, flow through the connecting conduit will cease and the source of pressurized air will be preserved. Thus, the aircraft pilot may thereafter initiate a new starting cycle and may then be successful in accomplishing starting of the aircraft engine.

The invention claimed is:

1. In a gas propelled starter for an aircraft engine or the like, the combination comprising a gas generator adapted to burn fuel, a pair of supply conduits connected with the generator and respectively connectible with pressurized sources of fuel and air, a normally closed valve disposed in each of said supply conduits, pneumatically operated means for opening each of said valves, and a control system for the starter comprising a valve control conduit connected to said pneumatically operated valve opening means and connectible with a source of pressurized air, normally closed valve means disposed in the valve control conduit and operable selectively to permit a flow of pressurized air therethrough for actuating said pneumatically operated means and opening said fuel and air valves, and normally closed speed responsive means operated by the starter for venting the valve control conduit at a predetermined starter speed whereby to close said fuel and air valves.

2. In a gas propelled starter for an aircraft engine or the like, the combination comprising a gas generator adapted to burn fuel, a pair of supply conduits connected with the generator and respectively connectible with pressurized sources of fuel and air, a normally closed valve disposed in each of said supply conduits, penumatically operated means for opening each of said valves, and a control system for the starter comprising a valve control conduit connected to said pneumatically operated valve opening means and connectible with a source of pressurized air, normally closed valve means disposed in the valve control conduit and operable selectively to permit a flow of pressurized air therethrough for actuating said pneumatically operated means and opening said fuel and air valves, normally closed speed responsive means operated by the starter for venting the valve control conduit at a predetermined starter speed whereby to close said fuel and air valves, and an igniter for the gas generator which is energized and de-energized responsive to air pressure in said valve control conduit.

3. In a gas propelled starter for an aircraft engine or the like, the combination comprising a gas generator adapted to burn fuel, a pair of supply conduits connected with the generator and respectively connectible with pressurized sources of fuel and air, a normally closed valve disposed in each of said supply conduits, pneumatically operated means for opening each of said valves and a control system for the starter comprising a valve control conduit connected to said pneumatically operated valve opening means and connectible with a source of pressurized air, normally closed valve means disposed in the valve control conduit and operable selectively to permit a flow of pressurized air therethrough for actuating said pneumatically operated means and opening said fuel and air valves, normally closed speed responsive means operated by the starter for venting the valve control conduit at a predetermined starter speed whereby to close said fuel and air valves, normally closed means operable to vent said control conduit responsive to pressure within said gas generator below normal combustion pressure whereby to close said fuel and air valves, and time delay means operable to render said last mentioned venting mean inoperable for a predetermined period of time subsequent to opening of said fuel and air valves.

4. In a gas propelled starter for an aircraft engine or the like, the combination comprising a gas generator adapted to burn fuel, a pair of supply conduits connected with the generator and respectively connectible with pressurized sources of fuel and air, a normally closed valve disposed in each of said supply conduits, pneumatically operated means for opening each of said valves, and a control system for the starter comprising a valve control conduit connected to said pneumatically operated valve opening means and connectible with a source of pressurized air, normally closed valve means disposed in the valve control conduit and operable selectively to permit a flow of pressurized air therethrough for actuating said pneumatically operated means and opening said fuel and air valves, normally closed speed responsive means operated by the starter for venting the valve control conduit at a predetermined starter speed whereby to close said fuel and air valves, normally closed means operable to vent said valve control conduit responsive to pressure within the gas generator in excess of normal combustion pressure, normally closed means operable to vent said control conduit responsive to pressure within said gas generator below normal combustion pressure, time delay means operable to render said last-mentioned venting means inoperable for a predetermined period of time subsequent to opening of said fuel and air valves, and an igniter for the gas generator which is energized and de-energized responsive to air pressure in said valve control conduit.

5. In a gas propelled starter for an aircraft engine or the like, the combination comprising a gas generator adapted to burn fuel, an air supply conduit connected to the generator and connectible with a pressurized source of air, a normally closed shut-off valve disposed in said air supply conduit, pneumatically operated means for opening said valve, and a control system for the starter comprising a valve control conduit connected to said pneumatically operated valve opening means and supplied with air from a pressurized source, a connecting conduit between the generator air supply conduit downstream of the shut-off valve therein and the valve control conduit, valve means disposed in the valve control conduit upstream of the connecting conduit and adapted first to be opened whereby to allow pressurized air to flow through said valve control conduit for opening the air shut-off valve and thereafter to be closed whereupon said air shut-off valve is held open by pressurized air supplied to said valve control conduit and the aforesaid valve opening means through said connecting conduit, and selectively operable means for venting the valve control conduit downstream of the connecting conduit whereby to close said air shut-off valve.

6. In a gas propelled starter for an aircraft engine or the like, the combination comprising a gas generator adapted to burn fuel, an air supply conduit connected to the generator and connectible with a pressurized source of air, a normally closed shut-off valve disposed in said air supply conduit, pneumatically operated means for opening said valve, and a control system for the starter comprising a valve control conduit connected to said valve opening means and supplied with air from a pressurized source, a connecting conduit between the generator air supply conduit downstream of the shut-off valve and the valve control conduit, valve means disposed in the valve control conduit upstream of the connecting conduit and adapted first to be opened whereby to allow pressurized air to flow through said valve control conduit for opening the air shut-off valve and thereafter to be closed whereupon said air shut-off valve is held open by pressurized air supplied to said valve control conduit and the aforesaid valve opening means through said connecting conduit, and normally closed speed responsive means operated by the starter for venting the valve control conduit at a predetermined starter speed whereby to close said air shut-off valve.

7. In a gas propelled starter for an aircraft engine or the like, the combination comprising a gas generator adapted to burn fuel, a pair of supply conduits connected to the generator and respectively connectible with pressurized sources of fuel and air, a normally closed shut-off valve disposed in each of said supply conduits, pneumatically operated means for opening each of said valves, and a control system for the starter comprising a valve control conduit connected to said pneumatically operated valve opening means and supplied with air from a pressurized source, a connecting conduit between the generator air supply conduit downstream of the shut-off valve therein and the valve control conduit, valve means disposed in the valve control conduit upstream of the connecting conduit and adapted first to be opened whereby to allow pressurized air to flow through said valve control conduit for actuating said pneumatically operated means and opening the fuel and air shut-off valves and thereafter to be closed whereupon said fuel and air shut-off valves are held open by pressurized air supplied to said valve control conduit and their operating means through said connecting conduit, normally closed speed responsive means operated by the starter for venting the valve control conduit at a predetermined starter speed whereby to close said fuel and air shut-off valves, normally closed means operable to vent said valve control conduit responsive to pressure within the gas generator in excess of normal combustion pressure, and normally closed means operable to vent said control conduit responsive to pressure within said gas generator below normal combustion pressure.

8. In a gas propelled starter for an aircraft engine or the like, the combination comprising a gas generator adapted to burn fuel, an air supply conduit connected to the generator and connectible with a pressurized source of air, a normally closed shut-off valve disposed in said air supply conduit, pneumatically operated means for opening said valve, and a control system for the starter comprising a valve control conduit connected to said pneumatically operated valve opening means and supplied with air from a pressurized source, a connecting conduit between the generator air supply conduit downstream of the shut-off valve therein and the valve control conduit, a normally closed electrically opened valve disposed in the valve control conduit upstream of the connecting conduit, a time delay shut-off valve disposed in said valve control conduit between the electrically opened valve and the connecting conduit and operable automatically to open when said electrically opened valve is opened and further operable automatically to close a predetermined period of time thereafter, said valve opening means being operated to open said air shut-off valve upon opening of the time delay valve by pressurized air flowing through said control conduit and said shut-off valve being held open after closing of said time delay valve by pressurized air supplied to said control conduit and said valve opening means through said connecting conduit, and selectively operable means for venting the valve control conduit downstream of the connecting conduit whereby to cause said pneumatically operated means to close said air shut-off valve.

9. In a gas propelled starter for an aircraft engine or the like, the combination comprising a gas generator adapted to burn fuel, an air supply conduit connected to the generator and connectible with a pressurized source of air, a normally closed shut-off valve disposed in said air supply conduit, pneumatically operated means for opening said valve, and a control system for the starter comprising a valve control conduit connected between said pneumatically operated valve opening means and the air supply conduit upstream of the air shut-off valve, a connecting conduit between the generator air supply conduit downstream of the shut-off valve therein and the valve control conduit, a normally closed electrically opened valve disposed in the valve control conduit upstream of the connecting conduit, a time delay shut-off valve disposed in said valve control conduit between the electrically opened valve and the connecting conduit and operable automatically to open when said electrically opened valve is opened and further operable automatically to close a predetermined period of time thereafter, said valve opening means being operated to open said air shut-off valve upon opening of the time delay valve by pressurized air flowing through said control conduit and said shut-off valve being held open after closing of said time delay valve by pressurized air supplied to said control conduit and said valve opening means through said connecting conduit, and normally closed speed responsive means operated by the starter for venting the valve control conduit at a predetermined starter speed whereby to close said air shut-off valve.

10. In a gas propelled starter for an aircraft engine or the like, the combination comprising a gas generator adapted to burn fuel, a pair of supply conduits connected to the generator and respectively connectible with pressurized sources of fuel and air, a normally closed shut-off valve disposed in each of said supply conduits, pneumatically operated means for opening each of said valves, and a control system for the starter comprising a valve control conduit connected to said pneumatically operated valve opening means and to the air supply conduit upstream of the air shut-off valve, a connecting conduit between the generator air supply conduit downstream of the shut-off valve therein and the valve control conduit, a normally closed electrically opened valve disposed in the valve control conduit upstream of the connecting conduit, a manually operable switch for connecting said electrically-opened valve with an electrical power source, a time delay shut-off valve disposed in said valve control conduit between the electrically opened valve and the connecting conduit and operable automatically to open when said electrically opened valve is opened and further operable automatically to close a predetermined period of time thereafter, said valve opening means being operated to open said fuel and air shut-off valves upon opening of the time delay valve by pressurized air flowing through said control conduit and said valves being held open after closing of said time delay valve by pressurized air supplied to said control conduit and valve opening means through said connecting conduit, normally closed speed responsive means operated by the starter for venting the valve control conduit at a predetermined starter speed whereby to close said fuel and air shut-off valves, an electrically operable igniter for the gas generator, a conductor for connecting said igniter to the aforesaid electrical power source through the aforesaid manually operable switch, and a pressure actuated switch interposed in said conductor and connected to said valve control conduit, said pressure actuated switch being closed when supplied with pressurized air from said control conduit and opened when said control conduit is vented.

References Cited in the file of this patent

UNITED STATES PATENTS

| | | |
|---|---|---|
| 2,325,103 | Bristol | July 27, 1943 |
| 2,708,342 | Allen | May 17, 1955 |
| 2,715,313 | Fleming | Aug. 16, 1955 |
| 2,742,759 | Flanigen | Apr. 24, 1956 |
| 2,816,417 | Bloomberg | Dec. 17, 1957 |
| 2,852,911 | West | Sept. 23, 1958 |